United States Patent
Shepherd et al.

(10) Patent No.: US 11,676,082 B2
(45) Date of Patent: Jun. 13, 2023

(54) TECHNOLOGIES FOR INTERRUPTIBILITY ANALYSIS AND NOTIFICATION

(71) Applicant: ABB Schweiz AG, Baden (CH)

(72) Inventors: David Shepherd, Raleigh, NC (US);
Patrick Francis, Raleigh, NC (US);
André Meyer, Waedenswil (CH);
Thomas Fritz, Zurich (CH);
Christopher Corley, Chattanooga, TN (US); Manuela Züger, Mellingen (CH)

(73) Assignee: ABB Schweiz AG, Baden (CH)

(*) Notice: Subject to any disclaimer, the term of this patent is extended or adjusted under 35 U.S.C. 154(b) by 209 days.

(21) Appl. No.: 16/413,093

(22) Filed: May 15, 2019

(65) Prior Publication Data

US 2019/0354916 A1    Nov. 21, 2019

Related U.S. Application Data

(60) Provisional application No. 62/672,027, filed on May 15, 2018.

(51) Int. Cl.
*G06Q 10/06* (2023.01)
*G06Q 10/0631* (2023.01)
*H04L 51/043* (2022.01)
*H04L 12/58* (2006.01)

(52) U.S. Cl.
CPC .... *G06Q 10/063114* (2013.01); *H04L 51/043* (2013.01)

(58) Field of Classification Search
CPC .............. G06Q 10/063114; H04L 51/043
USPC ...................................................... 705/7.15
See application file for complete search history.

(56) References Cited

U.S. PATENT DOCUMENTS

| | | | |
|---|---|---|---|
| 2009/0113311 A1* | 4/2009 | Fried ..................... | G06Q 10/10 715/753 |
| 2013/0217350 A1* | 8/2013 | Singh .................. | G06Q 10/109 702/19 |
| 2014/0095627 A1* | 4/2014 | Romagnino .......... | H04L 51/043 709/206 |
| 2017/0034348 A1* | 2/2017 | Chau ..................... | H04L 51/043 |

(Continued)

FOREIGN PATENT DOCUMENTS

WO    WO-2010042439 A2 *   4/2010    ..... G06Q 10/063114

OTHER PUBLICATIONS

Tell; Approximator: Predicting Interruptibility in Software Development with Commodity Computers; Jul. 16, 2016; https://ieeexplore.ieee.org/document/7224485?source=IQplus, p. 90-99.*

(Continued)

*Primary Examiner* — Mehmet Yesildag
*Assistant Examiner* — James Webb
(74) *Attorney, Agent, or Firm* — Armstrong Teasdale LLP

(57) ABSTRACT

Technologies for interruptibility analysis and notification are disclosed. In at least one illustrative embodiment, a method may comprise generating a live data stream including activity data received from one or more sensors associated with a worker, repeatedly generating an interruptibility status of the worker as a function of the activity data in the live data stream over a recent time period, and transmitting a signal that causes one of a plurality of status indicators to be displayed, the displayed status indicator corresponding to the current interruptibility status of the worker.

17 Claims, 4 Drawing Sheets

(56) References Cited

U.S. PATENT DOCUMENTS

| | | | | |
|---|---|---|---|---|
| 2018/0132776 A1* | 5/2018 | Flickinger | ............ | A61B 5/6803 |
| 2018/0232717 A1* | 8/2018 | Haraguchi | ........... | G07G 1/0018 |
| 2018/0349828 A1* | 12/2018 | Stelmar Netto | ......... | A61B 5/01 |
| 2019/0280993 A1* | 9/2019 | Queva | ..................... | G06F 3/011 |

OTHER PUBLICATIONS

Kobayashi; Development of E-mail Delivery Mediation System Based on Interruptibility and its Evaluation in Daily Office Work Scenario; Jul. 15, 2019; https://ieeexplore.ieee.org/document/8761860?source=IQplus; p. 94084-94096.*

* cited by examiner

TECHNOLOGIES FOR INTERRUPTIBILITY ANALYSIS AND NOTIFICATION

CROSS-REFERENCE TO RELATED APPLICATIONS

This application claims the benefit of U.S. Provisional Patent Application No. 62/672,027, filed May 15, 2018, the entire disclosure of which is incorporated herein by reference.

TECHNICAL FIELD

The present disclosure relates to technologies for interruptibility analysis and notification.

BACKGROUND

Workers, particularly those engaged in consuming and generating electronic documentation, often experience work activity of varying intensity. During the workday, a worker may sometimes be amenable to interruptions. For example, while reading nonessential email messages or waiting for a response from a supervisor, the worker may be interrupted by someone passing by the worker's office location and engaging the worker in conversation. At other times, a worker may be engaged in producing an important work document, requiring a level of energized focus or immersion that is sometimes termed "flow" or being "in the zone." In this latter scenario, the worker may not wish to be interrupted or be available for interruption for critical needs only. Interruptions at critical times can cause a decrease in productivity as a worker will often lose the focus or immersion a work task requires.

SUMMARY

According to one aspect of the present disclosure, a computing device may comprise an activity tracker to generate a live data stream including activity data received from one or more sensors associated with a worker, a status analyzer to repeatedly generate an interruptibility status of the worker as a function of the activity data in the live data stream over a recent time period, and a status manager to cause one of a plurality of status indicators to be displayed, the displayed status indicator corresponding to the current interruptibility status of the worker.

In some embodiments, to repeatedly generate the interruptibility status may comprise to iteratively sum the activity data in the live data stream over the recent time period and to compare each sum to one or more thresholds.

In some embodiments, the one or more thresholds may be set as a function of the activity data in the live data stream over a historical time period, the historical time period being longer than the recent time period.

In some embodiments, to repeatedly generate the interruptibility status may further comprise to assign heuristic weights to the activity data in the live data stream prior to iteratively summing the activity data in the live data stream over the recent time period.

In some embodiments, to repeatedly generate the interruptibility status may comprise to iteratively evaluate whether the activity data in the live data stream over the recent time period represents sustained activity.

In some embodiments, the one or more sensors may comprise at least one of a computer input device, a computer software monitor, a telephone, and a fitness tracker.

In some embodiments, the interruptibility status of the worker may represent one of an available status, a busy status, a do-not-disturb status, and an away status.

In some embodiments, to cause one of a plurality of status indicators to be displayed may comprise to transmit the interruptibility status of the worker to an instant messaging client.

In some embodiments, the computing device may further comprise a lighting device to be positioned within a workspace of the worker and to display one of a plurality of lighting patterns corresponding to the current interruptibility status of the worker.

According to one aspect of the present disclosure, a method may comprise generating a live data stream including activity data received from one or more sensors associated with a worker, repeatedly generating an interruptibility status of the worker as a function of the activity data in the live data stream over a recent time period, and transmitting a signal that causes one of a plurality of status indicators to be displayed, the displayed status indicator corresponding to the current interruptibility status of the worker.

In some embodiments, repeatedly generating the interruptibility status may comprise iteratively summing the activity data in the live data stream over the recent time period and comparing each sum to one or more thresholds.

In some embodiments, the one or more thresholds may be set as a function of the activity data in the live data stream over a historical time period, the historical time period being longer than the recent time period.

In some embodiments, repeatedly generating the interruptibility status may further comprise assigning heuristic weights to the activity data in the live data stream prior to iteratively summing the activity data in the live data stream over the recent time period.

In some embodiments, repeatedly generating the interruptibility status may comprise iteratively evaluating whether the activity data in the live data stream over the recent time period represents sustained activity.

In some embodiments, the one or more sensors may comprise at least one of a computer input device, a computer software monitor, a telephone, and a fitness tracker.

In some embodiments, the interruptibility status of the worker may represent one of an available status, a busy status, a do-not-disturb status, and an away status.

In some embodiments, transmitting the signal that causes one of the plurality of status indicators to be displayed may comprise transmitting the interruptibility status of the worker to an instant messaging client.

In some embodiments, transmitting the signal that causes one of the plurality of status indicators to be displayed may comprise transmitting the signal to a lighting device positioned within a workspace of the worker to cause the lighting device to display one of a plurality of lighting patterns corresponding to the current interruptibility status of the worker.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
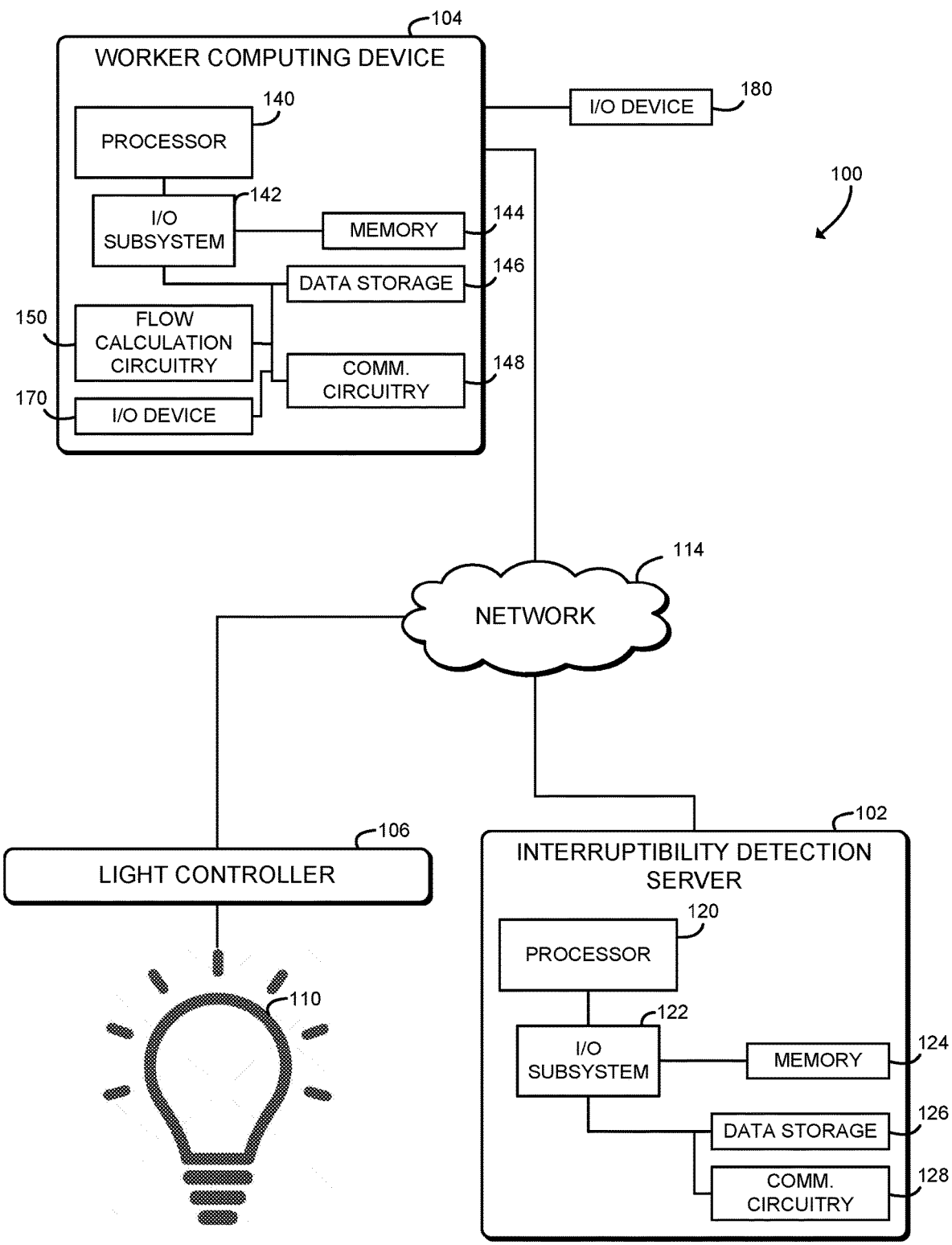
FIG. 1 is a simplified block diagram of at least one embodiment of a system for interruptibility analysis and notification.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one illustrative embodiment, a system 100 for interruptibility analysis and notification includes an interruptibility detection server 102, at least one worker computing device 104, and a light controller 106 in communication over a network 114. In use, as described in more detail below, the light controller 106 controls one or more displayable status indicator lights 110 that are associated with the worker computing device 104. It is contemplated that, in some embodiments, the light controller 106 may be coupled directly to the worker computing device 104. It is also contemplated that, in some embodiments, the system 100 for interruptibility analysis and notification need not include the interruptibility detection server 102 or the network 114, but, instead, the functionality of the interruptibility detection server 102 described herein may be implemented on the worker computing device 104 (with the light controller 106 coupled directly to the working computing device 104).

The worker computing device 104 is configured to collect activity data for a worker that is associated with the worker computing device 104. As used herein, activity data refers to any activity or interaction with the worker computing device 104, which may be embodied as any data indicative of keyboard keystrokes, mouse clicks, screen interactions, haptic device interactions, audio inputs/outputs, physical activity tracking device data, or the like.

In the illustrative embodiment shown in FIG. 1, the worker computing device 104 transmits the activity data to the interruptibility detection server 102, which tracks the activity data. In the illustrative embodiment, the interruptibility detection server 102 tracks the activity data as a continuous stream. In another embodiment, the interruptibility detection server 102 tracks the activity data as a series of data packets that are transmitted to the interruptibility detection server 102 at certain intervals (e.g., in a batch process). Of course, in some embodiments, the interruptibility detection server 102 may poll an approved list of worker computing devices 104 and/or other systems to receive the activity data. In alternative embodiments not employing the interruptibility detection server 102, the worker computing device 104 may track the activity data itself.

In the illustrative embodiment, the activity data stream includes at least one activity input. For example, the activity input may be one or more keystrokes, mouse clicks, button taps, screen interactions, or the like. The activity input may be generated from an input/output (I/O) device 170 integrated with the worker computing device 104. In the illustrative embodiment, the activity input is generated when a user interacts with an I/O device 180 that is communicatively coupled with the worker computing device 104. The interruptibility detection server 102 configures the light controller 106 to adjust the light 110. In the illustrative embodiment, the interruptibility detection server 102 configures the light controller 106 to adjust settings for the light 110 that include, for example, the color, brightness, contrast, on/off settings, flicker rate, flashing settings, or the like.

The interruptibility detection server 102 may limit activity tracking to worker computing devices 104 that are within or nearby a certain office or defined space including or more worker computing devices 104. In another embodiment, the interruptibility detection server 102 may be at a different physical site compared to the worker computing devices 104 from which the interruptibility detection server 102 receives activity data. The interruptibility detection server 102 may receive activity data from worker computing devices 104 located in various geographical locations. Essentially, the system 100 uses individual worker computing devices 104 as distributed activity data sources, and thus the system 100 may reduce the costs of interruptions and improve worker productivity by tracking worker activity and causing it to be interpreted and displayed by the displayable indicator light 110. Additionally, by receiving activity data from many worker computing devices 104, the system 100 may provide more accurate and individualized interruptibility detection and notification, allowing for individualized interruption analysis that enables workers and their supervisors to more accurately predict both interruptions and their cost and thus plan work activity accordingly. Additionally, by receiving activity data from many worker computing devices 104, the system 100 will, over time, learn worker patterns (e.g., weekly meetings that ought not to be interrupted except for critical needs only).

The interruptibility detection server 102 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. As shown in FIG. 1, the interruptibility detection server 102 illustratively includes a processor 120, an input/output subsystem 122, a memory 124, a data storage device 126, and communication circuitry 128. Of course, the interruptibility detection server 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments. Additionally, in some embodiments, the interruptibility detection server 102 may be embodied as a "virtual server" formed from multiple computing devices distributed across the network 114 and operating in a public or private cloud. Accordingly, although the interruptibility detection server 102 is illustrated in FIG. 1 as embodied as a single server computing device, it should be appreciated that the interruptibility detection server 102 may be embodied as multiple devices cooperating together to facilitate the functionality described below. It is also contemplated that, in some embodiments, the functionality of the interruptibility detection server 102 described herein may be implemented directly on the worker computing device 104 (i.e., without a separate interruptibility detection server 102).

The processor 120 of interruptibility detection server 102 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the interruptibility detection server 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the interruptibility detection server 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The data storage device 126 of interruptibility detection server 102 may be embodied as any type of device or devices configured for short-term or long-term storage of data such as, for example, memory devices and circuits, memory cards, hard disk drives, solid-state drives, or other data storage devices. The communication circuitry 128 of the interruptibility detection server 102 may be embodied as any communication circuit, device, or collection thereof, capable of enabling communications between the interruptibility detection server 102, the worker computing device 104, the light controller 106, and/or other remote devices over the network 114. The communication circuitry 128 may be configured to use any one or more communication technology (e.g., wired or wireless communications) and associated protocols (e.g., Ethernet, Bluetooth®, Wi-Fi®, WiMAX, etc.) to effect such communication.

Each worker computing device 104 is configured to transmit individualized activity data, which may be based on activity data or user input data captured by the worker computing device 104, to the interruptibility detection server 102 as described further below. The worker computing device 104 may be embodied as any type of computation or computer device capable of performing the functions described herein, including, without limitation, a smart phone, a tablet computer, a wearable computing device, a notebook computer, a laptop computer, a computer, a multiprocessor system, a desktop computer, a server, a network appliance, an in-vehicle infotainment system, a web appliance, a distributed computing system, a processor-based system, and/or a consumer electronic device. Illustratively, the worker computing device 104 includes a processor 140, an I/O subsystem 142, a memory 144, a data storage device 146, communication circuitry 148, and/or other components and devices commonly found in a smart phone or similar computing device (e.g., a touchscreen display or other I/O devices). In particular, the worker computing device 104 may include an I/O device 170 that the worker interacts with to generate activity data. In addition, the worker computing device 104 may have an I/O device 180 that is communicatively coupled to the worker computing device 104 as shown in FIG. 1. Those individual components of the worker computing device 104 may be similar to the corresponding components of the interruptibility detection server 102, the description of which is applicable to the corresponding components of the worker computing device 104 and is not repeated herein so as not to obscure the present disclosure. As noted above, it is also contemplated that the functionality of the interruptibility detection server 102 described herein may be implemented directly on the worker computing device 104.

The worker computing device 104 further includes flow calculation circuitry 150. The flow calculation circuitry 150 of the worker computing device 104 may be embodied as any type of circuit capable of calculating the interruptibility status (or flow interruptibility status) of a worker operating the worker computing device 104. For example, the flow calculation circuitry 150 may be embodied as a processor, capable of tracking an activity data stream that includes at least one activity input and preparing the activity data stream for transmission to the interruptibility detection server 102. In the illustrative embodiment, the flow calculation circuitry 150 is configured to associate one or more parameters or identifiers with the activity input before the activity data bearing the activity input is transmitted to the interruptibility detection server 102. For example, the flow calculation circuitry 150 will tag the activity input with the activity input time, activity input date, activity input location, activity input type, or the like. More specifically, the activity input location may be embodied as any data indicative of a geographical location identifier, an identifier of the worker computing device 104 where the activity was generated, or the like. Additionally, the activity input type may be embodied as any data indicative of a type or kind of activity. For example, the activity input type may be a data field including text such as "keystroke," "mouse click," etc. As another example, the activity input type may be a numerical character corresponding to type of activity, or some other data that the interruptibility detection server can later look up in a database or relationship table to determine the activity data type.

The I/O devices 170, 180 may be embodied as any electronic device or devices usable to receive human and/or environmental inputs and produce outputs that can be detected by a worker or another device. The I/O devices 170, 180 may include I/O devices that are typically configured for use with a desktop computing device, such as keyboards, mice, touchpads, keypads, scroll devices, trackballs, trackpads, pointer devices, touchscreens, display monitors, printers, scanners, CD-R/RW, DVD, and Blu-ray drives, digital cameras, microphones, floppy diskette drives, hard drives, modems, network adapters, SD cards, and/or USB thumb drives. The I/O devices 170, 180 may include I/O devices that are typically configured for use with a mobile computing device, such as touchscreens, touchpads, keypads, microphones, cameras, or the like.

I/O devices that are typically configured for use with a mobile computing device may also include motion or position sensors (e.g., accelerometers, gyroscopes, magnetic compasses, and other motion/position sensors), audio sensors, cameras, proximity sensors, ambient light sensors, touch input sensors, or similar sensors. I/O devices that are typically configured for use with a desktop computing device or mobile computing device may also include sensors capable of measuring temperature, humidity, light levels, or other environmental sensors. Additionally, the I/O devices 170, 180 may be embodied as any electronic device or devices usable to receive human inputs from physical activity. The I/O devices 170, 180 may include I/O devices to measure movements, steps, heart rate, body temperature, distance covered, or the like.

The light controller 106 is configured to control one or more components associated with the displayable indicator light 110. The light controller 106 may be embodied as any type of computation or computer device capable of performing the functions described herein, including, without limitation, a computer, a multiprocessor system, a server, a rack-mounted server, a blade server, a programmable logic controller, an embedded controller, an embedded system, a processor-based system, and/or a consumer electronic device. Thus, the light controller 106 may include a processor, an I/O subsystem, a memory, a data storage device, communication circuitry, and/or other components and devices commonly found in a computer or similar computing device. Those individual components of the light controller 106 may be similar to the corresponding components of the interruptibility detection server 102 and/or the worker computing device 104 and are not illustrated so as not to obscure the present disclosure. Additionally, although the light controller 106 is illustrated in FIG. 1 as embodied as a single computing device, it should be appreciated that the light controller 106 may be embodied as multiple devices (e.g., a network of light controllers 106 or a hierarchy of light controllers 106) cooperating together to control the displayable indicator lights 110 and otherwise facilitate the functionality described below. In some embodiments (not shown) the light controller 106 and the interruptibility detection server 102 may both be embodied in the same physical server device or collection of devices.

The displayable indicator lights 110 may include any electronically or electromechanically controllable systems associated with the displayable indicator light 110 or collection of displayable indicator light 110. For example, the displayable indicator lights 110 may include fluorescent lamps, light-emitting diode lamps, electrodeless lamps, or any other electric lighting device that is capable of displaying various colors, shades of colors, and/or light brightness levels. It should be understood that the technologies of this disclosure may be applied to control systems for other occupied structures, spaces, or machines, such as vehicles.

As discussed in more detail below, in the illustrative embodiment, the interruptibility detection server 102, the worker computing device 104, the light controller 106, and the displayable indicator light 110 may be configured to transmit and receive data with each other and/or other devices of the system 100 over the network 114. The network 114 may be embodied as any number of various wired and/or wireless networks. For example, the network 114 may be embodied as, or otherwise include, a wired or wireless local area network (LAN), a wired or wireless wide area network (WAN), a cellular network, and/or a publicly-accessible, global network such as the Internet. As such, the network 114 may include any number of additional devices, such as additional computers, routers, and switches, to facilitate communications among the devices of the system 100. It is also contemplated that, in alternative embodiments of the system 100 where the functionality of the interruptibility detection server 102 described herein is implemented directly on the worker computing device 104, the network 114 may be omitted.

Figure 2:
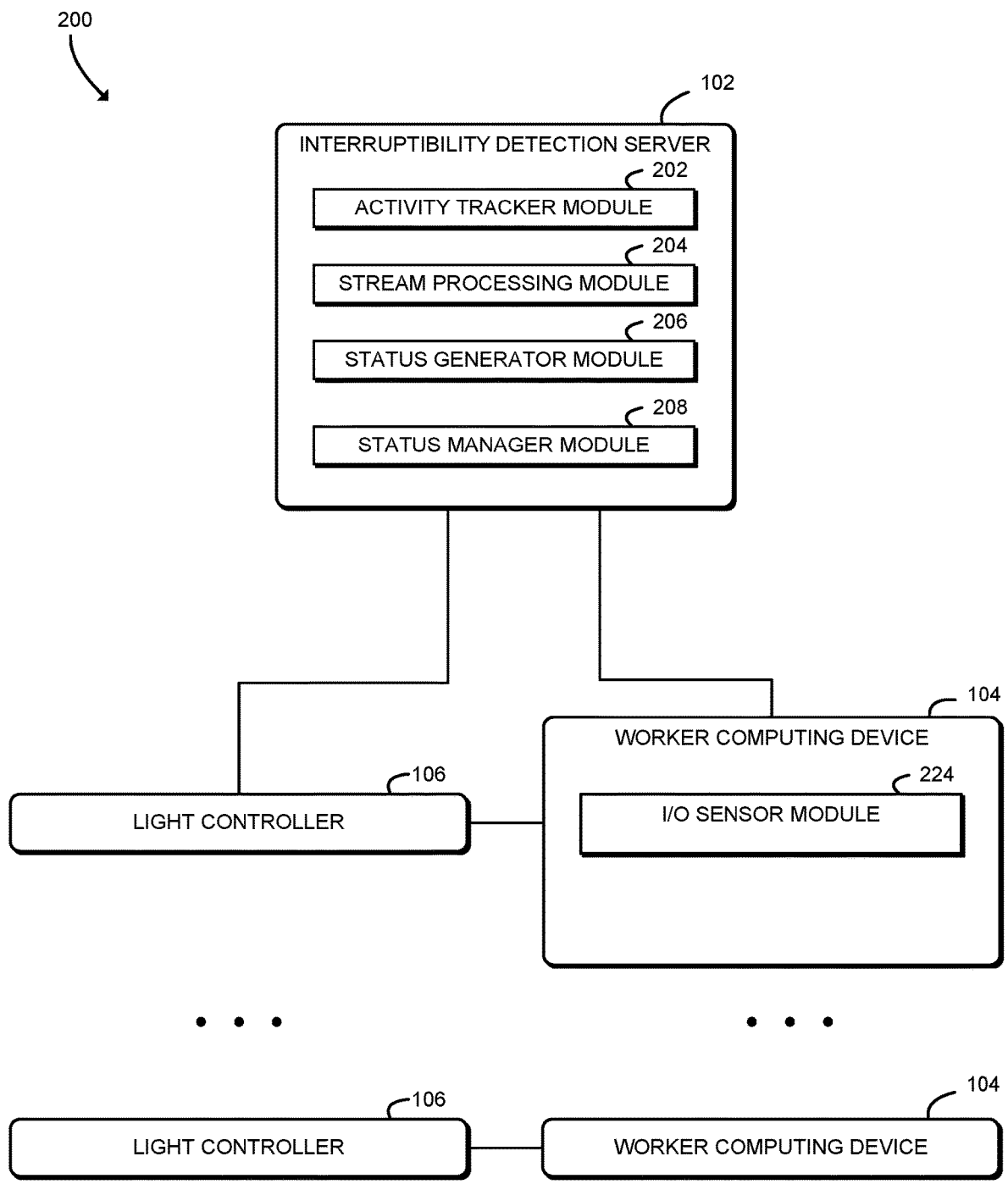
FIG. 2 is a simplified block diagram of at least one embodiment of various environments that may be established by the system of FIG. 1.

Referring now to FIG. 2, in an illustrative embodiment, the interruptibility detection server 102 establishes an environment 200 during operation. The illustrative environment 200 includes an activity tracker module 202, a stream processing module 204, a status generator module 206, and a status manager module 208. The various modules of the environment 200 may be embodied as hardware, firmware, software, or a combination thereof. For example the various modules, logic, and other components of the environment 200 may form a portion of, or otherwise be established by, the processor 120 or other hardware components of the interruptibility detection server 102. As such, in some embodiments, any one or more of the modules of the environment 200 may be embodied as a circuit or collection of electrical devices (e.g., activity tracker module circuitry 202, stream processing module circuitry 204, status generator module circuitry 206, and status manager module circuitry 208 etc.). As discussed above, in some embodiments, any one or more of the modules of the environment 200 may be implemented on the working computing device 104, rather than on the interruptibility detection server 102.

The activity tracker module 202 is configured to receive individualized activity data from the worker computing device 104. The individualized activity data is indicative of the activity of a worker at each worker computing device 104 based on one or more activity inputs produced at the worker computing device 104. For example, the individualized activity data may be indicative of a number or quantity of keystrokes, mouse clicks, mouse gestures, mouse movements, screen taps, or the like. The mouse movements may be tracked as pixels moved and/or scrolling as pixels scrolled. Keystrokes may be counted or logged without recording the specific key.

The activity data may be individualized by worker. For example, where more than one worker uses a worker computing device 104, the activity data can be associated with an identifier of the individual worker for tracking. Additionally, the activity tracker module 202 may be configured to treat part of the activity data stream as a significant subset of the activity data stream. As used herein, the term 'significant subset' refers to a time-bound portion of the activity data stream that is used to calculate the interruptibility of a worker. For example, the significant subset may be a period of time immediately preceding the current time (e.g., the last five minutes) during which a subset of the activity data stream is analyzed to determine interruptibility. In the illustrative embodiment, the significant subset represents a sliding window that moves forward in time. The activity tracker module 202 may be configured to assemble the activity inputs that are received during the significant subset and provide these activity inputs to the stream processing module 204. The activity tracker module 202 may be further configured to transmit feedback data to the worker computing device 104 in response to configuring the light controller 106.

The stream processing module 204 is configured to process the activity data stream that includes the individualized activity data. In the illustrative embodiment, the stream processing module 204 receives one or more activity inputs that are part of the activity data and analyzes the activity inputs to determine, for example, the identifier of the worker that generated the activity input. Additionally, the stream processing module 204 identifies the type of the activity input (e.g., keystroke, mouse click, screen tap, or the like). For example, and as described above with respect to the flow calculation circuitry 150, the activity input, once generated, is tagged with one or more identifiers to facilitate the operation of the stream processing module 204.

In the illustrative embodiment, the stream processing module 204 is configured to assign a heuristic weight to the at least one activity input. More specifically, the stream processing module 204 determines, over time, the frequency of each type of activity that is produced by a worker on the worker computing device 104. Based on this activity frequency, the stream processing module 204 may determine to give more weight to certain types of activity more than others. For example, a worker may be a graphic designer, in which case mouse clicks and mouse movements may be more significant to the worker compared to keystrokes. In other words, a certain degree of mouse activity may indicate that the worker is highly busy or is concentrating on an essential task. By contrast, the graphic designer may occasionally type out a quick email which may generate some degree of keyboard activity but may not represent an essential task that ought not to be interrupted. Accordingly, the stream processing module 204 is configured to assign greater weight to mouse activity compared to keyboard activity for the graphic designer. It should be understood that the stream processing module 204 may be configured to perform the opposite analysis, such as in a scenario where a graphic designer requests that his keyboard activity be considered non-interruptible as it requires greater skill or concentration for him or her.

The stream processing module 204 may also be configured to update an activity frequency for the significant subset based on the activity inputs received. As described above, the stream processing module 204 maintains an activity frequency metric for each type of activity input that is received by the stream processing module 204. As activity data bearing further activity inputs are received, the stream processing module 204 updates the activity frequency for each type of activity. In the illustrative embodiment, the stream processing module 204 may create a cumulative activity frequency metric that it provides to the status generator module 206.

The status generator module 206 is configured to generate an interruptibility status for the worker as a function of the activity frequency. In the illustrative embodiment, the status generator module 206 receives one or more cumulative activity frequency levels or metrics and assigns an interruptibility status for the worker accordingly. For example, the cumulative activity frequency may indicate that the user is available, such as where the activity frequency is low or has not changed greatly over the significant subset of the activity data stream. In other words, there may not be a great quantity or count of keystrokes, mouse clicks, or other activity inputs during the significant subset. Accordingly, the status generator module 206 assigns an interruptibility status of "Available" to the worker. Similarly, where the received activity frequency reveals a great deal of activity, the status generator module 206 may assign a status of "Busy" or "Do Not Disturb" based on the significant subset of the activity data stream. In the illustrative embodiment, the status generator module 206 sums up the activity data received in the significant subset according to the heuristic weights assigned to each type of event. The summed activity is ordered by frequency. If the activity is at a high end of the ordering (e.g., the top 4%) the worker may be assigned an interruptibility status of "Highly Busy" or "Do Not Disturb." Another intermediary range (e.g., top 4% to top 9%) may correspond to "Busy," and so on.

The status manager module 208 is configured to automatically cause a displayable indicator light to display the interruptibility status for the worker that is working on the worker computing device 104. In the illustrative embodiment, the status manager module 208 receives the status generated by the status generator module 208 and determines instructions that can be interpreted by the light controller 106 associated with the worker computing device 104. The instructions represent, for example, a color that the displayable indicator light 110 should display. For example, the status manager module 208 will receive an interruptibility status of "Do Not Disturb" and instruct the light controller 106 to cause the displayable indicator light 110 to display the color red. As another example, the status manager module 208 will receive an interruptibility status of "Available" and instruct the light controller 106 to cause the displayable indicator light 110 to display the color green. In a related embodiment, the status manager module 208 will receive an interruptibility status and instruct the light controller 106 to cause a computer-based or virtual status indicator (e.g., a status indicator icon within an instant message or chat program) to change its color according to the color scheme used for the displayable indicator light 110.

Still referring to FIG. 2, in the illustrative embodiment, each worker computing device 104 establishes an environment during operation. The illustrative environment includes an I/O module 224. The various modules of the environment 220 may be embodied as hardware, firmware, software, or a combination thereof. For example the various modules, logic, and other components of the environment 220 may form a portion of, or otherwise be established by, the processor 140 or other hardware components of the worker computing device 104. As such, in some embodiments, any one or more of the modules of the environment 220 may be embodied as a circuit or collection of electrical devices (e.g., a location circuit, a sensor circuit, etc.). Furthermore, it is contemplated that the environment 220 may include any one or more of the activity tracker module 202, the stream processing module 204, the status generator module 206, and the status manager module 208 described above.

The I/O module 224 is configured to receive and process activity inputs received from I/O devices (e.g., I/O devices 170, 180) associated with the worker computing device 104. For example, the I/O module 224 may be configured to receive and process activity inputs received from I/O devices of the worker computing device 104 using the flow calculation circuitry 150 and/or using the communication circuitry 148. In some embodiments, the I/O module 224 may be configured to detect that a worker has interacted with an I/O device (e.g., a keyboard) and generated activity inputs (e.g., a number of keystrokes) and provide a count of the activity inputs to the flow calculation circuitry 150.

Figure 3:
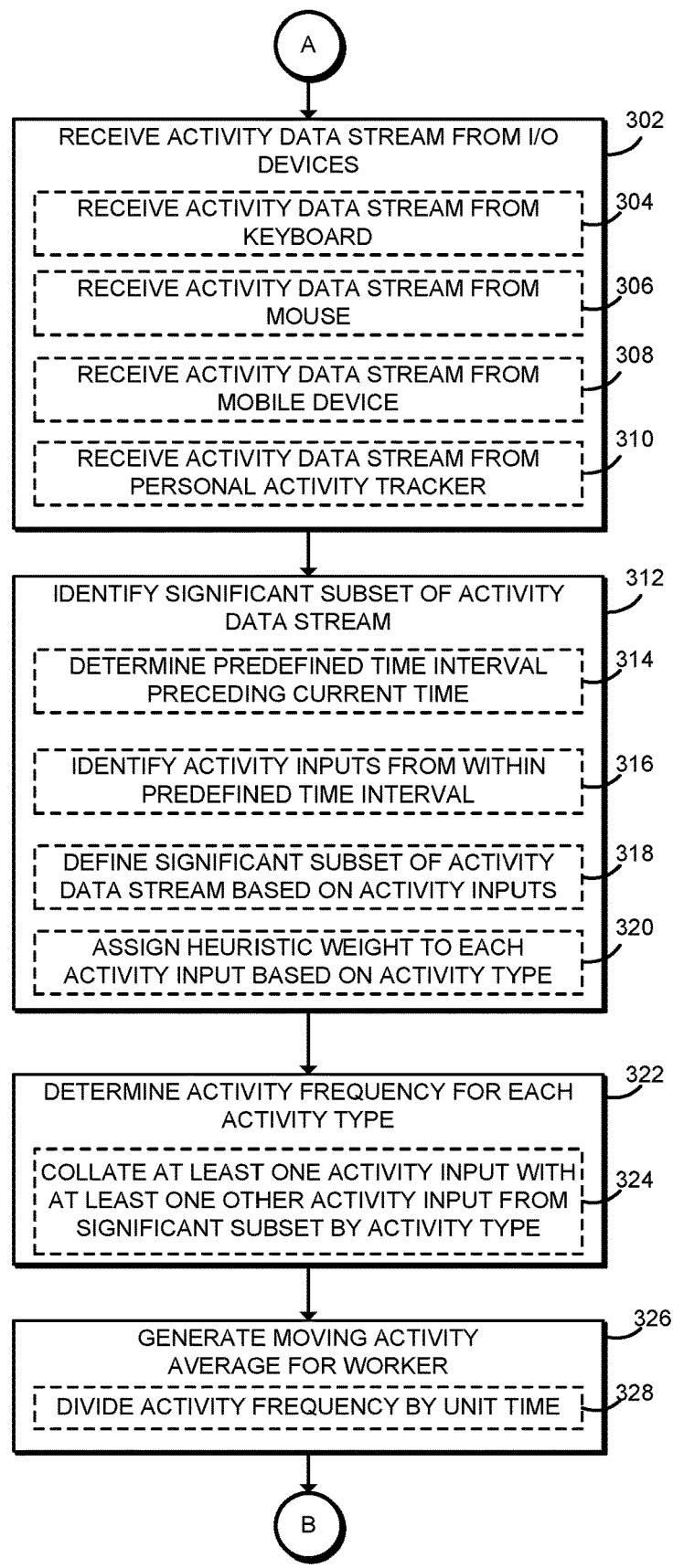
FIGS. 3 and 4 are a simplified flow diagram of at least one embodiment of a method for interruptibility analysis and notification that may be executed by the interruptibility detection server of the system of FIGS. 1 and 2.
Figure 4:
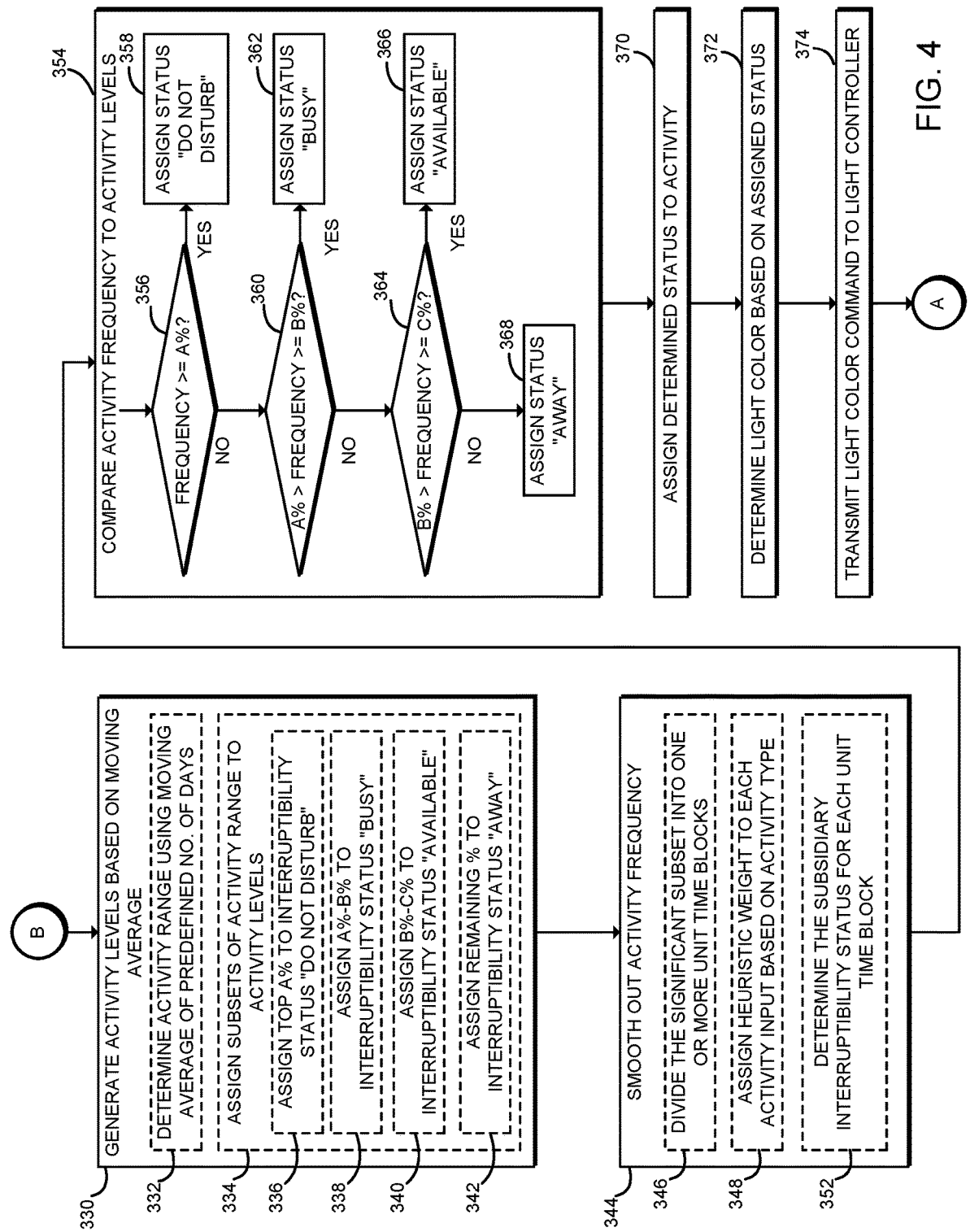

Referring now to FIGS. 3 and 4, in use, the interruptibility detection server 102 may execute a method 300 for interruptibility analysis and notification. It should be appreciated that, in some embodiments, the operations of the method 300 may be performed by one or more components of the environment 200 of the interruptibility detection server 102 as shown in FIG. 2, such as one or more of the activity tracker module 202, the stream processing module 204, the status generator module 206, and the status manager module 208. Additionally, it should be appreciated that one or more operations of the method 300 may be performed or facilitated by the worker computing device 104, with or without interaction with the interruptibility detection server 102.

The method 300 begins with block 302, in which the interruptibility detection server 102 receives an activity data stream from one or more I/O devices. As described earlier with respect to FIG. 1, the interruptibility detection server 102 may receive activity data as a stream of activity inputs that are generated when a worker interacts with I/O devices. For example, a worker will interact with one or more of I/O device 170 and I/O device 180. More specifically, and as illustrated in block 304, the interruptibility detection server 102 may receive an activity data stream that is generated from a keyboard. The worker computing device 104 may have an integrated keyboard or keypad (e.g., as illustrated in FIG. 1 by I/O device 170). For example, the worker computing device 104 may be a mobile device or phone device that has a keyboard or keypad. The keyboard or keypad may be composed of physical keys or be an electronic keypad, such as one that appears virtually on a screen. Similarly, the worker computing device 104 may be communicatively coupled to an I/O device 180. For example, the worker computing device 104 may be connected to a USB-based keyboard that can be used to generate keystrokes. In the illustrative embodiment, each keystroke is tracked (e.g., by the activity tracker module 202) and is associated with one or more parameters or identifiers. For example, each keystroke will be tagged with a count and a time of the keystroke. In one embodiment, each pressed key is counted as one keystroke. For example, pressing the CTRL and Enter keys together (e.g., to generate a page break on a document) will be counted as two keystrokes. In another embodiment, pressing the CTRL and Enter keys is counted as a single keystroke or keyboard action. In a related embodiment, the interruptibility detection server 102 is configured to store specific keystrokes, key combinations, or keyboard actions in terms of how each is to be counted for purposes of activity data.

Similar to block 304, in block 306, the interruptibility detection server 102 receives the activity data stream from mice and other point-and-click type devices. For example, the interruptibility detection server 102 receives the activity data stream from devices such as touchpads, scroll devices, trackballs, trackpads, pointer devices, or the like. In the illustrative embodiment, the interruptibility detection server 102 receives mouse clicks (left button clicks, right button clicks) that are counted in terms of single clicks for purposes of tracking activity input. In the illustrative embodiment, double-click actions are counted as a single activity input. In another embodiment, double-click actions are counted as two separate click actions. Click and drag actions are recorded in terms of both a click and a scroll action. In the illustrative embodiment, scroll actions (scrolls up, down, and sideways) are tracked in terms of pixels scrolled (unidirectionally) or otherwise traversed by the cursor.

As illustrated in block 308, the interruptibility detection server 102 also receives activity data inputs that are specific to mobile devices (e.g. smartphones). In the illustrative embodiment, the interruptibility detection server 102 may receive activity inputs such as touch inputs, audio inputs, swipe inputs, or the like. Similarly, and as illustrated in block 310, the interruptibility detection server 102 receives activity inputs from personal activity devices (e.g., heart rate monitors, step counters, temperature gauges, or the like).

The method advances to block 312, in which the interruptibility detection server 102 identifies a significant subset of the activity data stream that it receives. As described above, a significant subset of the activity data stream is used to calculate the interruptibility of a worker and may be interpreted as a time-bound portion of the activity data stream. More specifically, and as illustrated in block 314, the interruptibility detection server 102 determines a predefined time interval preceding the current time. For example, the interruptibility detection server 102, while receiving the activity data stream, identifies the current time (e.g., 10:00 AM) and identifies a prior time preceding the current time by a certain amount (e.g., five minutes). In one embodiment, the time interval may be adjusted by an operator of the interruptibility detection server 102 in order to calibrate the interruptibility analysis (e.g., based on special work periods, holidays, end of year deadlines, etc.). The interruptibility detection server 102 identifies activity data stream associated with the time interval between the prior time and the current time. The interruptibility detection server 102 selects the activity data inputs (e.g., mouse clicks, keystrokes, etc.) that were received as part of the identified activity data stream. As shown in block 316, the interruptibility detection server 102 identifies activity inputs from within the predefined time interval. As further shown in block 318, the interruptibility detection server 102 defines the significant subset of the activity data stream based on the activity inputs received within the predefined time interval.

In the illustrative embodiment, and as shown in block 320, the interruptibility detection server 102 assigns a weight to each activity input based on the activity type. Accordingly, one type of activity input may factor more or less into the interruptibility analysis compared to another type of input. In another embodiment, each activity input is treated as a single input that is equivalent to any other input, regardless of type, such that no weightage is assigned to the activity input for interruptibility analysis purposes.

In the illustrative embodiment, the assigned weight may be a heuristic weight. In other words, the weightage may be adjusted based on intuitive judgment or estimates that can later be adjusted. For example, a worker may be satisfied by the interruptibility status that is generated for the worker using the interruptibility detection server 102. So any weights assigned to the worker's activity inputs may remain unchanged. Conversely, where a worker indicates that the worker is being assigned an interruptibility status that does not accord with the worker's actual (or perceived) level of activity, the worker may request that the weightage be adjusted. As described above with respect to FIG. 2, the heuristic weights may be assigned according to known characteristics of the worker. In one embodiment, the interruptibility detection server 102 is configured to receive a job description, organizational chart, or other document that identifies a worker's job type and automatically determine heuristic weights to be assigned to the worker's activity. For example, the job description may identify the worker as a technical writer. For a technical writer, the interruptibility detection server 102 may determine that keystrokes are to be accorded greater heuristic weight whereas mouse clicks ought to be assigned comparatively lesser weight. As an example, periods of heavy mouse clicking for the technical writer may suggest non-work web browsing, rather than creation of work-related technical documentation. In other words, periods of heavy mouse clicking may be more likely to result in a status of, for example, "Available," for the technical writer.

The method advances to block 322, in which the interruptibility detection server 102 determines an activity frequency for each activity type, for a worker. More specifically, and as described above with respect to FIG. 2, the interruptibility detection server 102 actively maintains an activity frequency metric for each type of activity for a worker. For example, the interruptibility detection server 102 may maintain metrics for a worker's keystroke count and mouse click count for a particular work day. The aforementioned metrics may be stored in the data storage device 126, shown in FIG. 1. In the illustrative embodiment, the interruptibility detection server 102 is configured to reset the keystroke and mouse click counts for each work period (e.g., a work day or work session) and offload activity metrics for prior work periods.

As a work period progresses, the interruptibility detection server 102 is configured to update the activity frequency for the worker by type. More specifically, and as shown in block 324, the interruptibility detection server 102 collates at least one activity input with at least one other activity input from the significant subset by activity type. For example, the worker may have entered 10,000 keystrokes by 02:00 PM on a particular day. Subsequently, during the time period of 02:00 PM to 02:05 PM, the worker may enter 300 more keystrokes. Accordingly, for the 02:00 PM to 02:05 PM time period, the interruptibility detection server 102 is configured to update the keystroke count for the worker from 10,000 keystrokes to 10,300 keystrokes. Of course, other types of activity inputs (mouse clicks, swipes, paper prints, etc.) are maintained as separate metrics and updated accordingly. In another embodiment, the interruptibility detection server 102 is configured to update a single activity data metric that does not distinguish activity by type.

The method advances to block 326, in which the interruptibility detection server 102 generates a moving activity average for the worker. It should be understood that a worker's schedule, workload, work style, and productivity may exhibit significant variations over the course of a work day, work week, or over different stretches of the worker's career. For example, a worker may be become more efficient at performing a task over time, due to greater experience and training. Accordingly, greater efficiency may translate into a higher number of activity inputs or a different type or mix of activity inputs. Similarly, one worker's work activity may differ markedly from that of another worker, even on the same task. At least for these reasons, the interruptibility detection server 102 is configured to generate a moving activity average for a worker. The moving activity average serves as a baseline against which the interruptibility detection server 102 can determine how busy and thus how interruptible the worker is. Certain types of workers (e.g., analysts or data entry professionals) may have higher moving activity averages than other types (e.g., managers or directors).

Specifically, and as illustrated in block 328, the interruptibility detection server 102 determines the activity frequency for each type of activity within the significant subset. The interruptibility detection server 102 is configured to generate a ratio to represent the average. For example, the interruptibility detection server 102 divides the determined activity frequency by a unit of time to get the moving activity average. The moving activity average may be represented in keystrokes per minute, pixels moved per minute, mouse clicks per hour, or the like.

The method advances to block 330, in which the interruptibility detection server 102 generates activity levels based on moving average. As used herein, an activity level refers to a certain percentile level of activity for a worker, based on an average activity. As illustrated in block 332, the interruptibility detection server 102 determines an activity range using the moving activity average for a predefined number of days. The objective is to determine a worker's maximum activity level and minimum activity level and to order or sort each time period in the worker's activity according to, for example, a number of activity inputs received. Once a worker's activity is determined in terms of a minimum (e.g., zero activity), and a maximum, the worker's activity as represented by the activity data stream for the predefined number of days, is organized or ranked in terms of an activity level. In the illustrative embodiment, each subset of the activity data stream is sorted by amount as a percentage of the maximum. In other words, if the maximum activity level for a worker in the predefined number of days is, for example, 1000 keystrokes per minute, that would form the $100^{th}$ percentile activity level for the worker. Any other subset of the activity data stream where the worker produced 500 keystrokes per minute would correspond to an activity level of the $50^{th}$ percentile, and so on.

In the illustrative embodiment, the interruptibility detection server 102 analyzes the activity data stream for a worker over, for example, five working days of activity comprising Monday through Friday in a particular month. For this period, the interruptibility detection server 102 generates a moving activity average. For example, a worker's moving activity average may be 100 keystrokes per minute. In addition, the interruptibility detection server 102 is configured to organize the five-day period by level of activity. For example, the interruptibility detection server 102 may identify that, during the 09:00 AM to 09:30 AM time period on Monday, the activity data stream showed 300 keystrokes per minute. Similarly, the interruptibility detection server 102 may identify that, during the 09:00 AM to 09:30 AM time period on Wednesday, the activity data stream showed 200 keystrokes per minute. Similarly, the interruptibility detection server 102 may identify that, during the 09:00 AM to 09:30 AM time period on Friday, the activity data stream showed 80 keystrokes per minute.

Accordingly, the interruptibility detection server 102 is configured to determine that the Monday time period was more active than the Friday time period. As the interruptibility detection server 102 orders each subset of time during the Monday-Friday time period, the interruptibility detection server 102 assigns percentile values as activity levels. More specifically, the interruptibility detection server 102 is configured to sort each subset of time by activity level. For example, the aforementioned Monday time period may represent the top 5% of level of activity for the worker. In other words, the worker was as active as or more active than the Monday time period for 5% of that Monday-Friday time period. Accordingly, the Monday 09:00-09:30 time period will represent the top 5% activity level for the worker. Similarly, the Wednesday time period may represent the top 20% activity level for the worker. In other words, the worker was more active than that Wednesday time period (e.g., entered more than 200 keystrokes per minute) at least 20% of the time.

As illustrated in block 334, the interruptibility detection server 102 assigns the subsets of the determined activity range to various activity levels. In the illustrative embodiment, the interruptibility detection server 102 is configured to associate one or more activity levels to an interruptibility status. For example, and as illustrated in block 336, the interruptibility detection server 102 may assign the top A % of activity levels to an interruptibility status of "Do Not Disturb," where A=5. Similarly, and as illustrated in block 338, the interruptibility detection server 102 may assign A %-B % of activity levels to interruptibility status of "Busy," where A=5 and B=10. Additionally, and as illustrated in block 340, the interruptibility detection server 102 may assign B %-C % of activity levels to interruptibility status of "Available," where B=10 and C=50. Furthermore, and as illustrated in block 342, the interruptibility detection server 102 may assign remaining D % of activity levels to interruptibility status of "Away," where the Dth percentile represents all activity levels that are at 50 or lower (e.g., the bottom half of activity levels). Of course, the percentiles and the interruptibility status labels may vary from the above example and may be adjusted based on supervisor or worker preferences.

The method advances to block 344, the interruptibility detection server 102 determines to smooth out the activity frequency that is being received as part of the activity data stream. In the illustrative embodiment, a worker may report to the interruptibility detection server 102 that the interruptibility status being generated is too sensitive to certain input. For instance, a quick twenty-second burst of typing may cause a user to temporarily be shown as Busy, since that time period included a sudden high degree of activity. However, the worker may have been available to be interrupted for the remainder of the time period. For example, the twenty-second burst of typing may have been only within the first minute of a five minute time period, with the remaining four minutes including no keystrokes or other activity inputs. In the illustrative embodiment, this is addressed so that the interruptibility detection server 102 is configured to assign a worker to certain activity level only if the worker exhibits that activity level in each subsidiary time period of the observed time period (or significant subset). In other words, the worker would have to exhibit a number of activity inputs that meet the activity level for each subsidiary or fractional interval within the observed time period or significant subset (e.g., within each minute of a significant subset of five minutes).

Accordingly, and as illustrated in block 346, the interruptibility detection server 102 divides the significant subset into one or more unit time blocks. For example, a significant subset of five minutes is decomposed into five blocks of one minute each, or ten blocks of thirty seconds each. As illustrated in block 348, the interruptibility detection server 102 assigns a heuristic weight to each activity input based on the activity type for the activity inputs. Accordingly, and as illustrated in block 350, the interruptibility detection server 102 determine that the subsidiary interruptibility status for a unit time block exceeds a certain activity level. For example, the interruptibility detection server 102 may determine that for each minute within a five-minute significant subset, the worker's activity reached an activity level of 300 keystrokes per minute. Based on the worker's moving activity average, 300 keystrokes per minute may represent a top 10% activity level, which may in turn translate into an interruptibility status of "Busy." In block 352, the interruptibility detection server 102 generates a subsidiary interruptibility status for each unit time block.

The method advances to block 354, the interruptibility detection server 102 compares the activity frequency to the determined activity levels. For example, and as illustrated in block 356, the interruptibility detection server 102 determines whether the activity frequency corresponds to an activity level that is greater than or equal to a top A % (e.g., the top 5%), as described above with respect to block 336. If the activity level is greater than or equal to the top A %, then as shown in block 358, the interruptibility detection server 102 may assign a status of "Do not Disturb." This indicates that the worker is producing peak levels of activity, such as the top 5% of his or activity level (or 95% of the maximum activity level ever reached by the worker).

Similarly, in block 360, the interruptibility detection server 102 determines whether the activity frequency corresponds to an activity level that is less than an activity level corresponding to some percentage A but greater than some percentage B of the activity levels, then the interruptibility detection server 102 may, in block 362, assign a status of "Busy." This indicates that the worker is producing significant levels of activity, such as the top 5%-10% of his or activity level (or 90-95% of the maximum activity level ever reached by the worker).

Similarly, in block 364, the interruptibility detection server 102 determines whether the activity frequency corresponds to an activity level that is less than an activity level corresponding to some percentage B but greater than some percentage C of the activity levels, then the interruptibility detection server 102 may, in block 366, assign a status of "Do not Disturb." This indicates that the worker is producing peak levels of activity, such as the top 10%-50% of his or activity level (or 50-90% of the maximum activity level ever reached by the worker). Similarly, in block 368, the interruptibility detection server 102 assigns a status of "Away" if the interruptibility detection server 102 determines that the activity frequency falls below some percentage C (e.g., 50%). It should be understood that the above-mentioned activity frequency percentile values and status labels are for illustration purposes only. The interruptibility detection server 102 is configured to perform the disclosed systems and methods using any combination of percentile values and corresponding status designations.

The method advances to block 370, where the interruptibility detection server 102 assigns the determined status to the activity data stream for the worker. For example, the interruptibility detection server 102 may determine that the worker is currently generating activity inputs corresponding to an interruptibility status of "Busy." Accordingly, the "Busy" status is assigned to the worker based on the significant subset of time (e.g., the past five minutes). The method advances to block 372, in which the interruptibility detection server 102 determines a light color based on the assigned status. In the illustrative embodiment, the displayable indicator light 110 (shown in FIG. 1) is configured to display various light colors. Each light color corresponds to a particular interruptibility status. For example, and merely for purposes of illustration, the possible worker interruptibility statuses and corresponding colors may be "Do Not Disturb"—Red; "Busy"—Orange, "Available"—Green, and "Away"—Yellow. In addition, the displayable indicator light 110 may be configured to display a white color or turn off when the worker is offline. Accordingly, where an interruptibility status of "Busy" is determined, the corresponding light color (e.g., orange) is identified.

As illustrated in block 374, the interruptibility detection server 102 transmits a light color command to the light controller 106. In the illustrative embodiment, the light color command includes instructions regarding the particular interruptibility status and corresponding light color. In one embodiment, the interruptibility detection server 102 may simply transmit a data field bearing the desired color to the light controller 106. The light controller 106 may then extract the data field from the light color command and adjust the displayable indicator light 110 accordingly. In another embodiment, the interruptibility detection server 102 may generate specific light color instructions that the light controller 106 may execute directly to adjust the displayable indicator light 110 to the color (e.g., orange) that corresponds to the determined interruptibility status. After the light color command is transmitted to the light controller 106, the method 300 loops back to block 302 to continue receiving the activity data stream for the worker.

While certain illustrative embodiments have been described in detail in the drawings and the foregoing description, such an illustration and description is to be considered as exemplary and not restrictive in character, it being understood that only illustrative embodiments have been shown and described and that all changes and modifications that come within the spirit of the disclosure are desired to be protected. There exist a plurality of advantages of the present disclosure arising from the various features of the apparatus, systems, and methods described herein. It will be noted that alternative embodiments of the apparatus, systems, and methods of the present disclosure may not include all of the features described, yet still benefit from at least some of the advantages of such features. Those of ordinary skill in the art may readily devise their own implementations of the apparatus, systems, and methods that incorporate one or more of the features of the present disclosure.

The invention claimed is:

1. A computing device comprising:
an activity tracker to generate a live data stream including activity data received from one or more sensors associated with a worker, wherein the activity data include activities of the worker performed with a worker computing device;
a status generator to repeatedly generate an interruptibility status of the worker as a function of the activity data in the live data stream over a recent time period and of heuristic weights associated with respective types of activity in the activity data, wherein the interruptibility status is determined by iteratively summing the weighted activity data in the live data stream over the recent time period and comparing each sum to one or more thresholds, and wherein the heuristic weights are determined based on a frequency of each type of activity in the activity data;
a status manager to cause one of a plurality of status indicators to be displayed, the displayed status indicator corresponding to a current interruptibility status determined for the worker; and
a lighting device associated with the worker, the lighting device to be positioned within a workspace of the worker and to display one of a plurality of lighting patterns corresponding to the current interruptibility status determined for the worker.

2. The computing device of claim 1, wherein the one or more thresholds are set as a function of the activity data in the live data stream over a historical time period, the historical time period being longer than the recent time period.

3. The computing device of claim 1, wherein to repeatedly generate the interruptibility status further comprises to assign the heuristic weights to the activity data in the live data stream prior to iteratively summing the activity data in the live data stream over the recent time period.

4. The computing device of claim 1, wherein to repeatedly generate the interruptibility status comprises to iteratively evaluate whether the activity data in the live data stream over the recent time period represents sustained activity.

5. The computing device of claim 1, wherein the one or more sensors comprise at least one of a computer input device, a computer software monitor, a telephone, and a fitness tracker.

6. The computing device of claim 1, wherein the interruptibility status of the worker represents one of an available status, a busy status, a do-not-disturb status, and an away status.

7. The computing device of claim 1, wherein to cause one of a plurality of status indicators to be displayed comprises to transmit the interruptibility status of the worker to an instant messaging client.

8. A method comprising:
generating a live data stream including activity data received from one or more sensors associated with a worker, wherein the activity data include activities of the worker performed with a worker computing device;
repeatedly generating an interruptibility status of the worker as a function of the activity data in the live data stream over a recent time period and of heuristic weights associated with respective types of activity in the activity data, wherein the interruptibility status is determined as a function of a job type of the worker by iteratively summing the weighted activity data in the live data stream over the recent time period and comparing each sum to one or more thresholds, and wherein the heuristic weights are determined based on a frequency of each type of activity in the activity data; and
transmitting a signal that causes one of a plurality of status indicators to be displayed, the displayed status indicator corresponding to a current interruptibility status of the worker, wherein transmitting the signal that causes one of the plurality of status indicators to be displayed comprises transmitting the signal to a lighting device associated with the worker, the lighting device positioned within a workspace of the worker to cause the lighting device to display one of a plurality of lighting patterns corresponding to the current interruptibility status determined for the worker.

9. The computing device of claim 1, wherein to repeatedly generate the interruptibility status further comprises: to adjust the heuristic weights based on feedback.

10. The computing device of claim 1, wherein to repeatedly generate the interruptibility status further comprises: to generate a moving activity average of the worker; and to determine the interruptibility status using the moving activity average as a baseline of the worker.

11. The method of claim 8, wherein the one or more thresholds are set as a function of the activity data in the live data stream over a historical time period, the historical time period being longer than the recent time period.

12. The method of claim 8, wherein repeatedly generating the interruptibility status further comprises assigning the heuristic weights to the activity data in the live data stream prior to iteratively summing the activity data in the live data stream over the recent time period.

13. The method of claim 8, wherein repeatedly generating the interruptibility status comprises iteratively evaluating whether the activity data in the live data stream over the recent time period represents sustained activity.

14. The method of claim 8, wherein the one or more sensors comprise at least one of a computer input device, a computer software monitor, a telephone, and a fitness tracker.

15. The method of claim 8, wherein the interruptibility status of the worker represents one of an available status, a busy status, a do-not-disturb status, and an away status.

16. The method of claim 8, wherein transmitting the signal that causes one of the plurality of status indicators to be displayed comprises transmitting the interruptibility status of the worker to an instant messaging client.

17. A system of interruptibility analysis and notification, comprising:
 a computing device, comprising:
  an activity tracker to generate a live data stream including activity data received from one or more sensors associated with a worker, wherein the activity data includes activities of the worker performed with a worker computing device;
  a status generator to repeatedly generate an interruptibility status of the worker as a function of the activity data in the live data stream over a recent time period and of heuristic weights associated with respective types of activity in the activity data, wherein the interruptibility status is determined by iteratively summing the weighted activity data in the live data stream over the recent time period and comparing each sum to one or more thresholds, and wherein the heuristic weights are determined based on a frequency of each type of activity in the activity data; and
  a status manager to cause one of a plurality of status indicators to be displayed, the displayed status indicator corresponding to a current interruptibility status determined for the worker; and
 a lighting device associated with the worker, the lighting device to be positioned within a workspace of the worker and to display one of a plurality of lighting patterns corresponding to the current interruptibility status determined for the worker.

* * * * *